P. E. NORRIS.
MACHINE FOR CLEANING LUGS OF STORAGE BATTERY PLATES.
APPLICATION FILED JULY 22, 1918. RENEWED MAY 29, 1920.
1,372,979.
Patented Mar. 29, 1921.
5 SHEETS—SHEET 4.
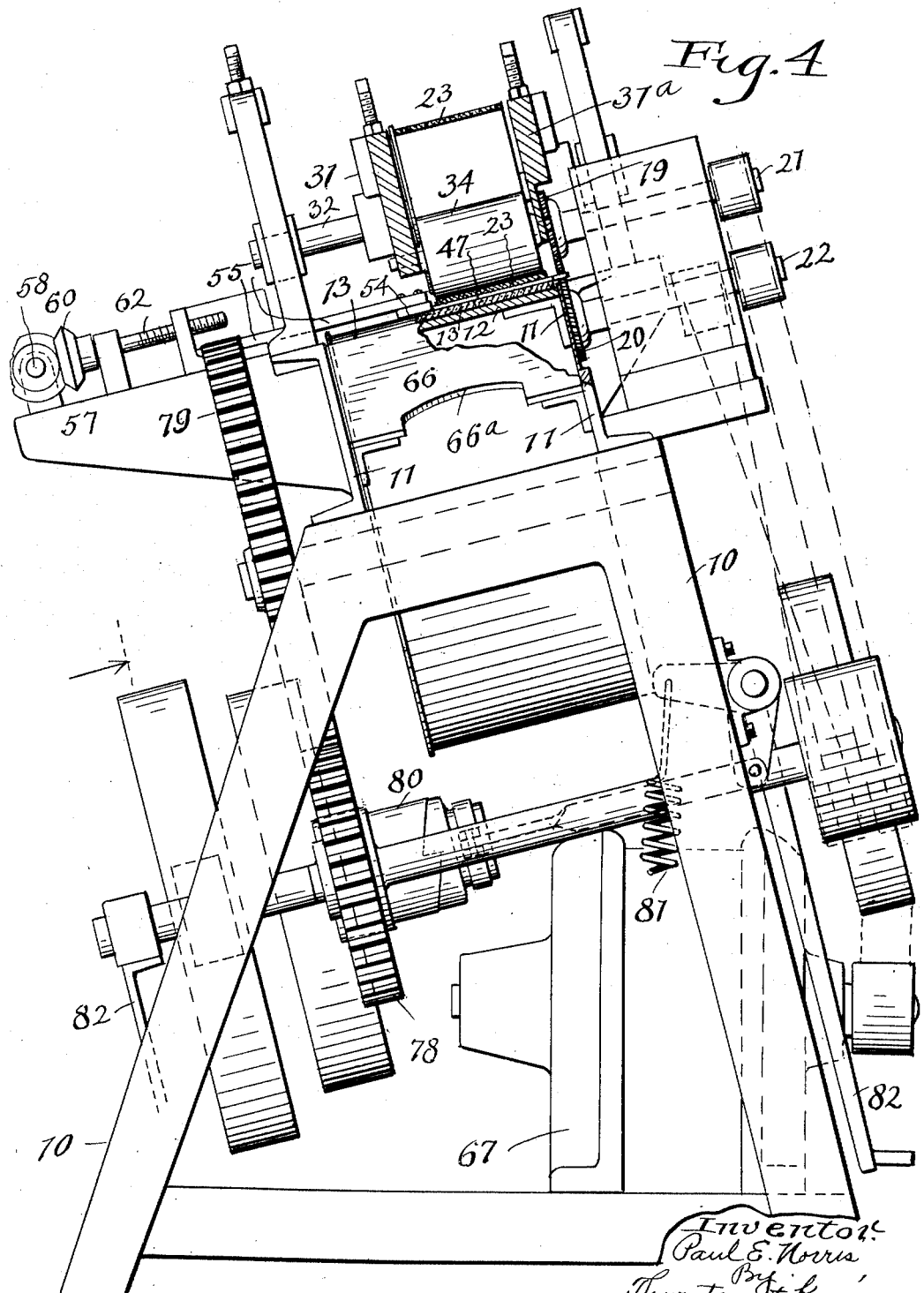

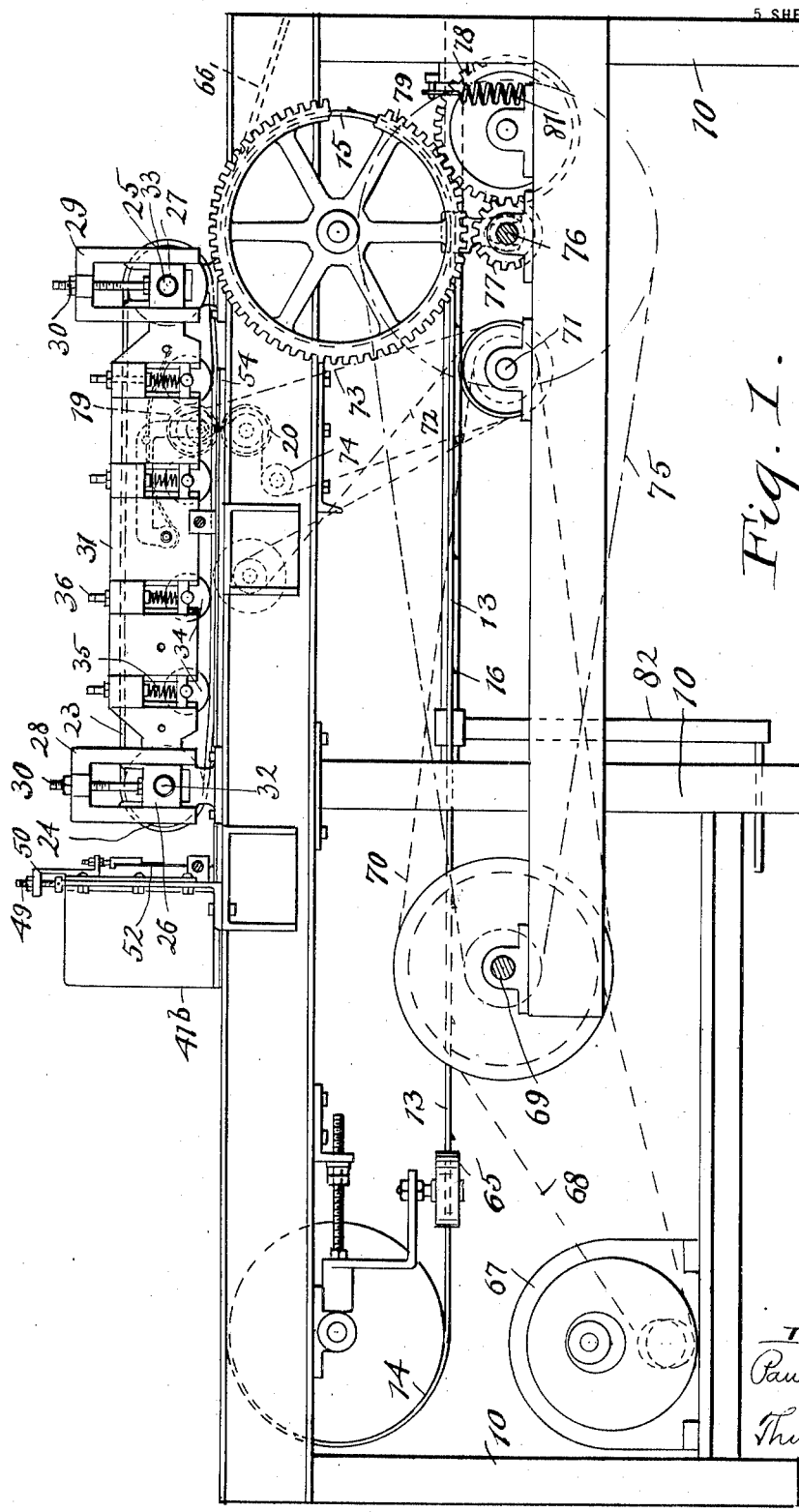

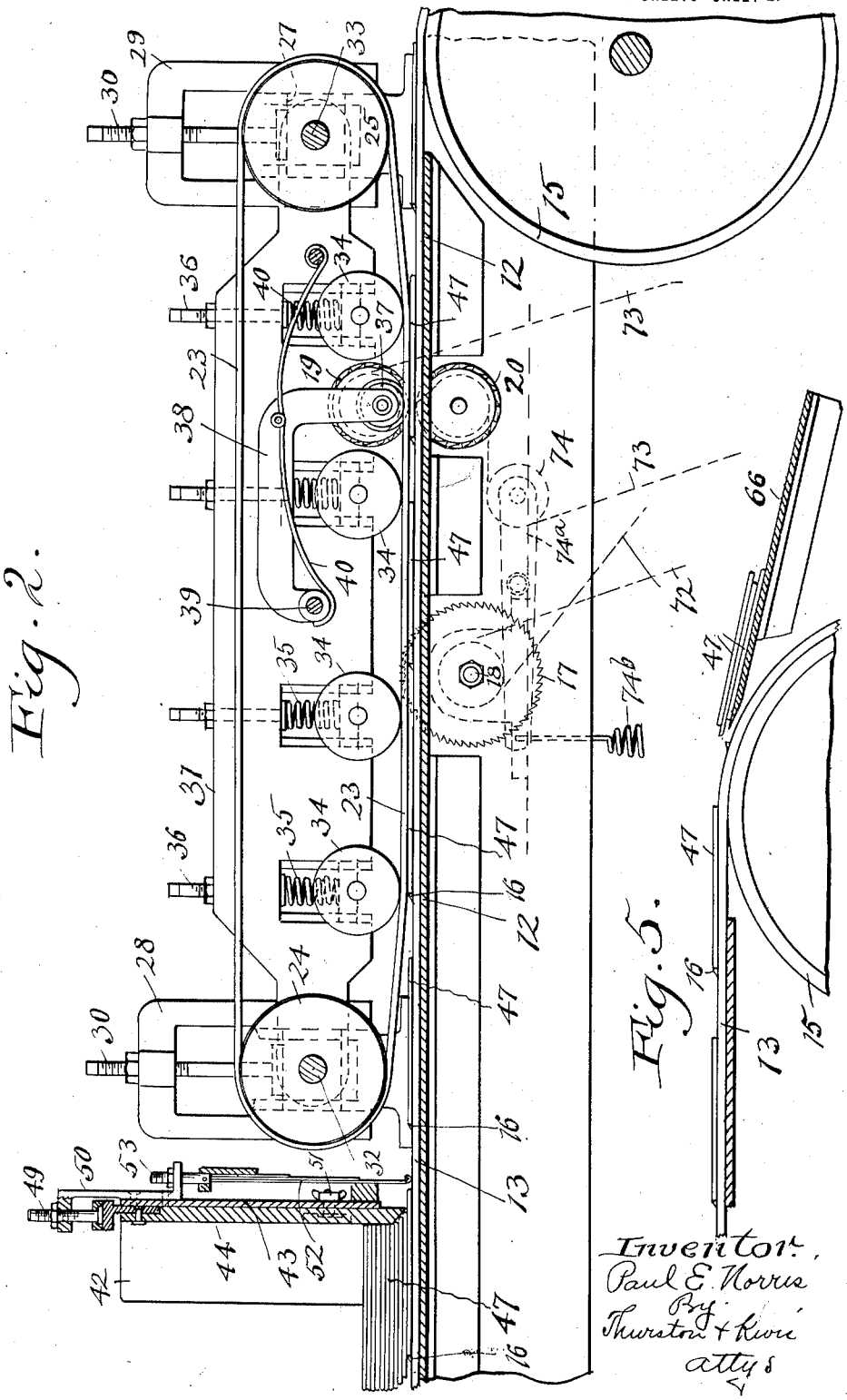

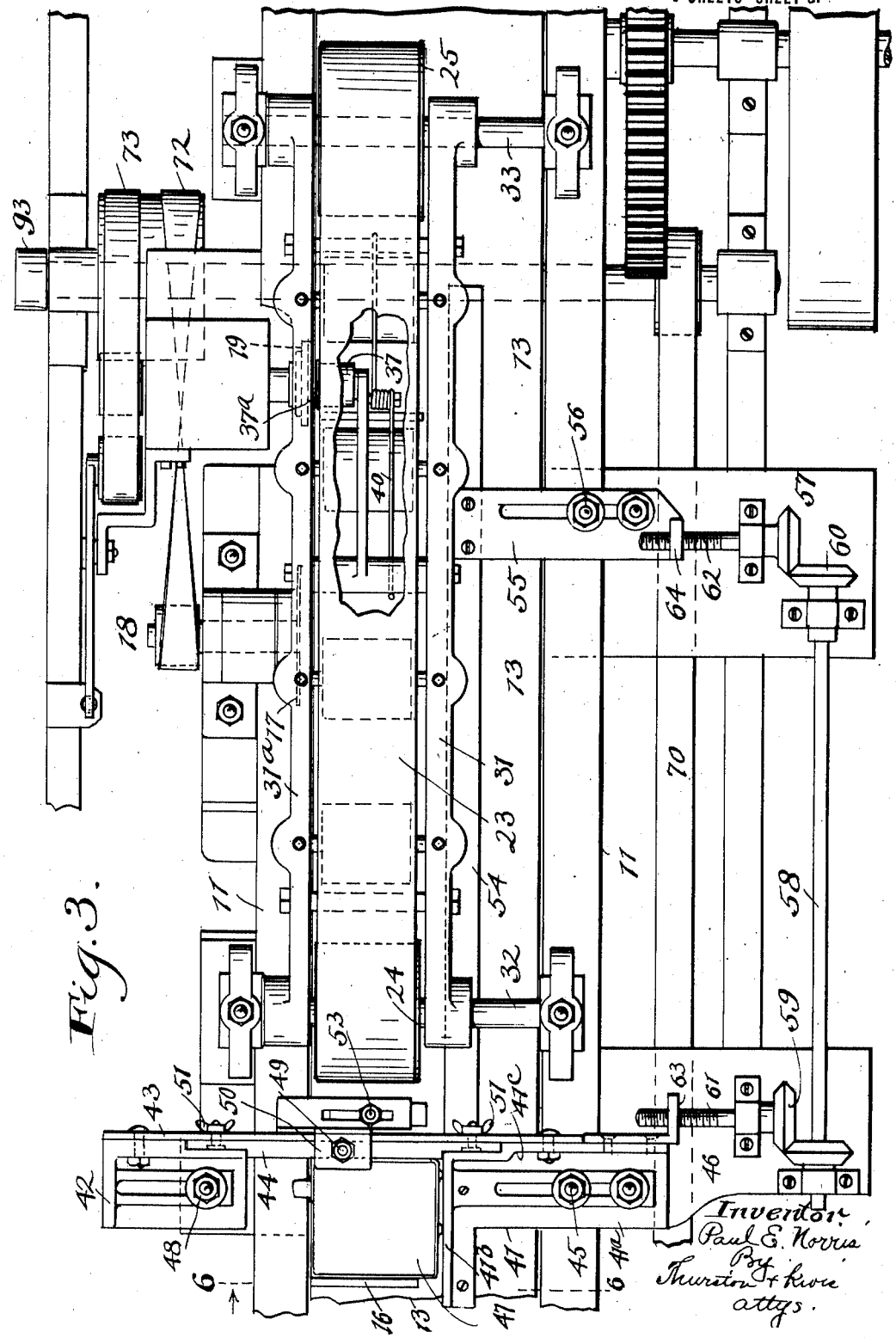

P. E. NORRIS.
MACHINE FOR CLEANING LUGS OF STORAGE BATTERY PLATES.
APPLICATION FILED JULY 22, 1918; RENEWED MAY 29, 1920.
1,372,979.
Patented Mar. 29, 1921.
5 SHEETS—SHEET 5.
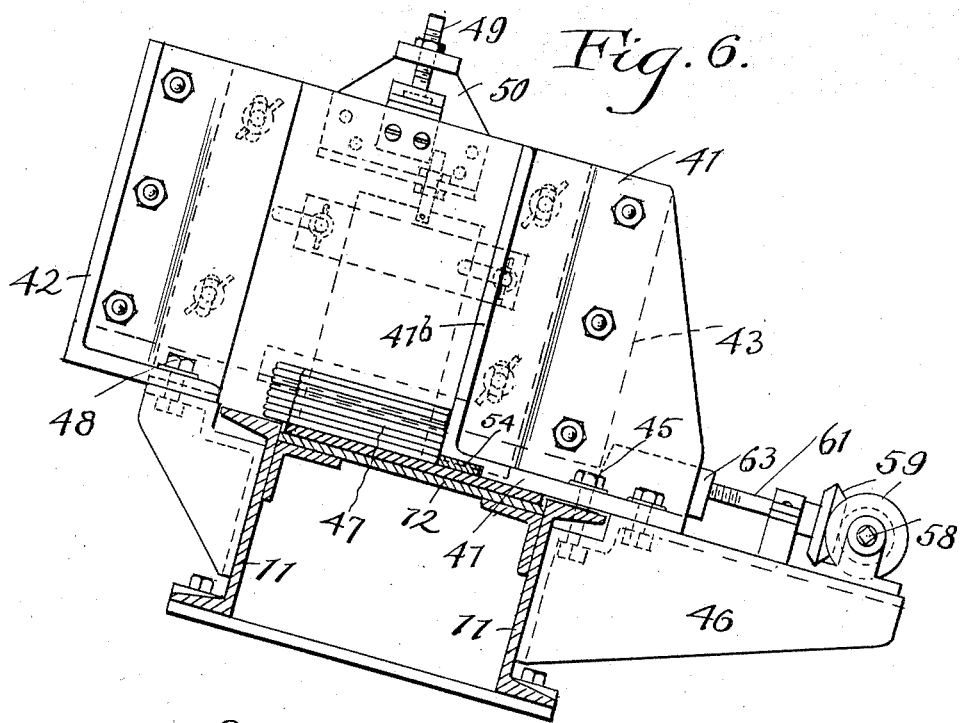
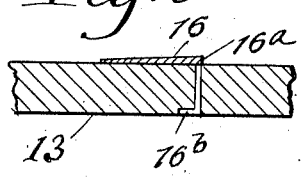
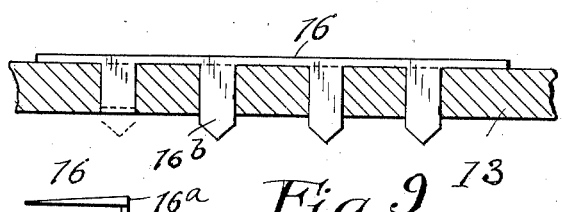
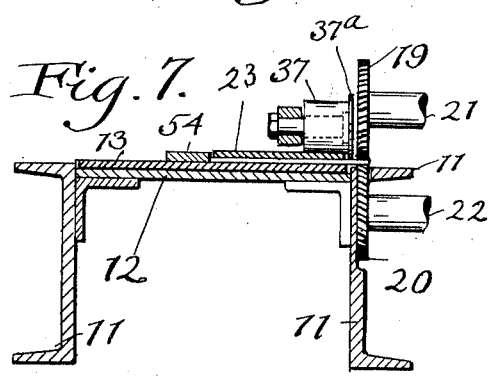

UNITED STATES PATENT OFFICE.

PAUL E. NORRIS, OF EAST CLEVELAND, OHIO, ASSIGNOR TO WILLARD STORAGE BATTERY COMPANY, OF CLEVELAND, OHIO, A CORPORATION OF WEST VIRGINIA.

MACHINE FOR CLEANING LUGS OF STORAGE-BATTERY PLATES.

1,372,979. Specification of Letters Patent. Patented Mar. 29, 1921.

Application filed July 22, 1918, Serial No. 246,244. Renewed May 29, 1920. Serial No. 385,384.

*To all whom it may concern:*

Be it known that I, PAUL E. NORRIS, a citizen of the United States, residing at East Cleveland, in the county of Cuyahoga and State of Ohio, have invented a certain new and useful Improvement in Machines for Cleaning Lugs of Storage - Battery Plates, of which the following is a full, clear, and exact description.

This invention relates to a machine for cleaning the lugs of storage battery plates.

It is customary in the art of making storage batteries to connect the plates of storage batteries in groups by so-called straps, and in order that this may be done the plates are provided with lugs designed to be inserted in slots of the straps and to be lead-burned thereto. In order that good results may be obtained it is quite important that the lugs be of uniform height, and that the sides and ends of the lugs be cleaned of oxids and foreign matter.

The present machine is designed to rapidly and effectively cut off the surplus ends of the lugs so that they will all be of uniform length and clean on the ends, and to mill opposite sides of the lugs so as to thoroughly clean them.

The object of the present invention is to provide a machine which will receive a stack of plates having lugs to be cleaned, and will successively and rapidly carry them through the machine past a lug cutting saw, and between lug cleaning tools, such as milling tools, and finally discharge the plate at the rear end of the machine with the lugs properly cleaned and cut for lead burning, without liability of the machine being clogged or its operation otherwise obstructed, even though the plates may not be flat or otherwise absolutely true. Other objects include means whereby the plates are caused to traverse in the correct and desired path in passing through the machine, also whereby the machine may be adapted for plates of different sizes without varying the position of the cutting tools, whereby the plates are properly discharged at the rear end of the machine, whereby the plates feed properly from the receiving magazine onto the belt which is designed to carry them through the machine, and other such specific objects which gives the machine great utility, and render it highly efficient.

The invention may be briefly summarized as consisting in certain novel details of construction and combinations and arrangements of parts which will be described in the specification and set forth in the appended claims.

In the accompanying sheets of drawings wherein I have shown the preferred embodiment of my invention, Figure 1 is substantially a side view of the machine but viewed from the angle indicated by the arrow at the left of Fig. 4, since the bed of the machine and the major portion of the parts supported on it are at an angle with respect to the horizontal; Fig. 2 is a similar view but with the parts principally in section, the section being taken longitudinally of the machine; Fig. 3 is a top plan view of so much of the machine as shown in Fig. 2; Fig. 4 is an end view looking toward the rear end of the machine; Fig. 5 is a detail view showing the manner in which plates are discharged at the rear end of the machine; Fig. 6 is a transverse sectional view substantially along the line 6—6 of Fig. 3 looking in the direction indicated by the arrows; Fig. 7 is a sectional view showing particularly the action of an auxiliary pressing and lug straightening roller employed adjacent the milling tools; and Figs. 8, 9 and 10 are enlarged detail views illustrating the manner in which the cleats are formed and attached to the belt which carries the plates through the machine; Fig. 8 being a fragmentary longitudinal section through the belt and cleat, Fig. 9 being a transverse section along the side of the cleat and Fig. 10 being an end view of the cleat before it is attached to the belt.

The machine includes supporting legs 10 and a bed formed principally of two channels 11 extending lengthwise of the machine, and a plate 12 extending between these channels, this plate forming a base or table onto which the upper portion of the main conveying belt is pressed as will be subsequently explained.

It should be noted at this point that this bed as well as the parts supported by it are set at an angle to the horizontal for a purpose to be subsequently explained, the tipped or inclined arrangement being shown in Figs. 4 and 6.

The plates whose lugs are to be cleaned by being milled on opposite sides and to be cut by a saw so as to make them of uniform length, are taken from a feed magazine to be referred to presently, and are carried one at a time from the magazine, past the saw and milling cutter and this is accomplished by means of a carrying belt 13, passing over pulleys 14 and 15 (see Fig. 1) located near the front and rear ends of the beds. This belt is provided at intervals with cleats 16 which are spaced apart a distance slightly greater than the width of the plates to be operated on. Preferably each cleat is formed and attached to the belt 13 in the manner illustrated in Figs. 8 and 9, from which it will be seen that each cleat has an abrupt front edge or face 16$^a$ and tapers off toward the rear edge, and that the front part of the cleat is provided with prongs 16$^b$ which extend through the belt and are bent over or clenched on the inner side of the latter. The important advantage of this construction is that the front edge of the cleat is fastened to the belt in such a manner that in passing around the pulleys the front edge will not be pulled away from the belt so that dirt can get under the front edge, as is the case if the cleat is fastened to the belt at a point distant from the front edge.

As the plates pass through the machine they are carried past the teeth of the saw 17 (see Figs. 2 and 3) rotatably supported by a shaft 18, this saw being designed to cut off the ends of the lugs so as to make the latter of uniform length as before stated and to clean the ends of the lugs. Shortly after passing the saw the plates are carried between a pair of milling cutters 19 and 20 which clean the sides of the lugs, these cutters being supported on shafts 21 and 22 (see Fig. 4). Both the saw and the milling cutters are located just beyond the edge of the conveyer belt 13 on the higher side of the bed.

As the plates are being carried through the machine and are operated on by the saw and cutters, it is important that they be held down firmly onto the belt and prevented from moving. I therefore provide above a portion of the plate conveying belt, a second belt 23 passing about pulleys 24 and 25 mounted on shafts journaled in bearing blocks 26 and 27 adjustable vertically in guides 28 and 29, said bearing blocks being movable vertically by adjusting screws 30. I do not regard it as essential that the bearings for these pulley shafts be adjustable but the adjustable feature may be provided if desired. These guides which support the bearings 26 and 27 are mounted on the bed above or beyond the side edges of the main conveyer belt 13.

In conjunction with this belt 23 I provide devices which yieldingly press the lower portion of the belt down onto the upper portion of the main conveyer belt 13 or upon the plates carried by the latter, and these presser members include two castings 31 and 31$^a$ which are supported in parallel relationship and are hung on shafts 32 and 33 which support the pulleys 24 and 25 about which the belt 23 travels. These castings carry a plurality of presser rollers 34 which are about the width of the upper belt 23, and press the lower portion of this belt downwardly as before stated. These rollers are pressed downwardly yieldingly by springs 35, the pressure of which on the rollers may be varied by adjusting screws 36 which project above the upper edges of the castings 31 and 31$^a$. It will be understood that these castings have slots in which bearings for the rollers 34 are vertically movable.

In addition to these presser rollers 34 I provide an auxiliary or special pressing roller 37, which as will be observed from Figs. 2, 3 and 7, is directly opposite the milling cutters 19 and 20. This is provided as a precautionary measure to insure the plates being firmly and properly held between the two belts at the time that they are passing between the milling cutters. This roller is mounted at the lower end of an L-shaped arm 38 pivoted at 39 between the castings 31 and 31$^a$, a leaf spring 40 being utilized to press the roller yieldingly downward. (See Fig. 2.) As shown in Fig. 7 one end of the roller 37 projects toward the cutters slightly beyond the edges of the belts and this projecting end has a rim or bead 37$^a$ which presses on the lugs of the battery plates, straightening them if they are bent.

It should be noted at this point that although the main conveyer belt 13 is driven in the manner hereinafter explained, the upper belt has no direct driving means but it is rotated or driven frictionally or indirectly by the lower belt 13, and because the adjacent portions of the two belts are pressed together by the rollers as explained, they travel at precisely the same speed with the plates firmly and practically immovably clamped between them.

Having explained the devices which carry the plates through the machine and which operate on the lugs, I will next explain an important feature of the invention consisting of the feed magazine and guide bar, and the manner in which they are constructed and adjusted to adapt the machine for plates of different sizes and to insure their correct positioning with respect to the lug cutting and cleaning tools as they are carried through the machine.

The feed magazine is composed of four principal parts, namely, a flanged or angular member 41 (see Figs. 3 and 6) secured to one side of the bed, a second flanged member 42 secured to the opposite side of the bed, a transverse plate 43 which is bolted to both of these members and rigidly fastens them together, and an adjustable feed board 44 secured to one side of the plate 43 (see Fig. 2). By reference particularly to Figs. 3 and 6 it will be seen that the member 41 is provided with a flat base 41$^a$ slotted to accommodate bolts 45 which secure the member 41 to one of the channels of the bed and to a laterally projecting arm or bracket 46 secured to one side of the bed. The member 41 of the magazine also includes an upright wall or flange 41$^b$ which is at right angles to the plane of feed of the plates and is inclined to the vertical as clearly indicated in Fig. 6. Additionally the member 41 includes a flange or wall 41$^c$ at right angles to the flange or wall 41$^b$, and to which the transverse member 43 is bolted. The inclined inner face of the flange 41$^b$ is an important adjunct of the feed magazine for when a stack of plates 47 (see Fig. 6) is placed by the operator on the belt just at the angle between the flange 41$^b$ and feed board 44, due to the inclination of the structure and the action of the belt 13, the plates aline themselves against the inner inclined face of the flange 41$^b$ and against the forward face of the feed board 44, so that they will be properly positioned as they are carried by the belt from the feed magazine. The member 42 performs no function in the supporting of the plates but is utilized in rigidly supporting the feed magazine, this member having a slotted base through which passes a bolt 48 to secure the member to a bracket on the side of the bed opposite that to which the member 41 is secured.

The feed board 44 has a lower beveled edge which tapers upwardly and forwardly or in the direction of the front end of the machine, the extreme lower edge of the board being spaced from the belt 13 a distance slightly greater than the thickness of the plates 47. This feed board may be adjusted vertically to vary the height or thickness of the slot through which the plates are fed by means of an adjusting screw 49 connected to the top edge of the feed board and mounted in a bracket 50 at the top of the transverse plate 43. Before the adjustment is made, thumb nuts 51 on bolts which pass through elongated slots of the feed board and normally secure the latter to the transverse member 43 are loosened, and after the adjustment they are tightened so that the feed board will be held in proper position.

The beveled edge at the lower end of the feed board is important for the reason that it insures the correct feeding of the plates even though they are not flat but curved as they frequently, and in fact, generally are. The curved forward edges by engaging the beveled surface are forced downward so that when a plate becomes the lowermost in the stack its front edge is so positioned that it can be pulled by the belt beneath the feed board and along through the machine. It will be understood that the successive cleats on the rapidly traveling belt 13 take the plates one at a time from the bottom of the stack in the feed magazine and carry them through the machine.

In order that the rear edge of each plate will seat squarely against the face of the cleat before the plate leaves the magazine, I provide on the rear side of the magazine a downwardly extending leaf spring 52 (see Fig. 2) secured by a vertically adjustable screw 53 to the lower flanged end of the bracket 50. The lower end of this spring is close to the upper surface of the belt 13, and as the plates emerge from the feed magazine they engage the lower end of this spring which imposes a resistance to their movement and forces them squarely against the cleats.

Another important feature of the machine utilized in conjunction with the tipped or inclined arrangement of the bed and the feeding parts, is a guide 54 consisting of a long straight strip which is secured to and is rigid with the feed magazine and extends therefrom for a distance toward the rear end of the machine, the forward or inner edge of this strip being in line with the inner plate engaging face of the upright flange or wall 41$^b$ of the feed magazine. The forward end of this guide 54 is supported by the feed magazine, and the guide is supported near its opposite end by an arm 55 secured to the guide and slotted to accommodate bolts 56 which adjustably secure the arm along the channels of the bed and to a bracket 57 which like the bracket 46 extends laterally from the bed.

The function of this guide which extends over the feeding portion of the belt 13 and alongside the edge of the coöperating portion of the upper belt 23 is to guide the traveling plates and to position them properly with respect to the saw and milling tools. In the latter respect it performs the function of a gage, it being understood that due to the inclination of the bed and feeding structure there is a natural tendency for the lower edges of the inclined plates to slide along the guide for its entire length.

The feed magazine and this guide are adjustable as a unit laterally of the bed to adapt the machine for plates of different sizes and to bring the lugs in the right position with respect to the saw and milling cutters. An adjusting mechanism is provided consisting of a shaft 58 (see Fig. 3), one end of which is squared so that it may be turned by a suitable tool, this shaft being connected by bevel gearing 59 and 60 to two adjusting screws 61 and 62, the former having a threaded engagement with the flanged portion of a member 63 projecting from the feed magazine, and the latter having threaded engagement with the flanged portion 64 of the bracket or arm 55 which is secured to the guide 54. By turning the shaft 58 in one direction or the other, the feed magazine and guide are moved inwardly or outwardly, all portions moving the same amount, and the guide being maintained in parallel relationship with the edges of the belts. It might be stated at this point that the feeding belt 13 is accurately positioned by adjustable guide wheels 65, one of which is shown in Fig. 1, and one of which is provided on each side of the belt.

As the plates are carried through the machine, the lugs are cut off by the saw, the opposite faces of the lugs are milled and then the plates are discharged at the rear end of the machine on a discharge board 66 which is inclined as shown so that the plates will be piled up onto the same. When a stack has collected on the discharge board 66 the operator will remove them, the extreme rear end of the discharge board being recessed as shown at 66$^a$ in Fig. 4 to enable the operator to conveniently and quickly remove a stack of the plates.

Before taking up the driving mechanism it may be mentioned that the feed magazine is located well beyond the forward pulley 14 about which the feeding belt 13 travels, so that before the cleats pick up the plates, the portion of the belt to which the cleats are attached is sufficiently beyond the pulley to be flat and is sliding over the upper surface of the flat plate or table 12 extending between the channels of the bed, and the upper belt which presses the plates down onto the feeding belt 13 is a sufficient distance beyond the feed magazine that the plates will be lying squarely against the cleats, and squarely against the guide strip 54 before they are pressed down and firmly held against the feeding belt 13. These are important features for the successful operation of the machine.

It will be obvious that the feeding belt and the saw and milling cutters may be driven in various ways, but in the drawings I have shown one form of drive which operates satisfactorily. This includes a motor 67, preferably an electric motor, which is supported near the lower front end of the machine. Through a belt 68 (see Fig. 1) this motor drives a transverse shaft 69, and this shaft through suitable pulleys and through a belt 70 drives a shaft 71 which operates the saw and milling cutters. The saw is rotated by a belt 72 engaging pulleys on the saw shaft 18, and on the transverse shaft 71, and the milling cutters are driven by a belt 73 which is looped about pulleys on the cutter shafts 21 and 22 and about a pulley on the transverse shaft 71 and an idler pulley 74 near the lower cutter 20, as shown by dotted lines in Figs. 1 and 2. The pulley 74 is supported on a lever 74$^a$ to one end of which is attached a tensioning spring 74$^b$ (see Fig. 2).

Additionally the shaft 69 through a belt 75 drives a transverse shaft 76, which through gears 77, 78 and 79 (the last named being coaxial with the rear pulley 15 of the belt 13) drives the shaft to which the pulley 15 is attached, and thus drives the traveling plate feeding belt 13. A suitable clutch shown at 80 in Fig. 4, disconnects the gear 77 from the shaft 76 to stop the rotation of the belt. The clutch is preferably thrown out by a spring 81 (see Fig. 4) and it is thrown in by a suitable clutch operating member 82 (see Fig. 1), the precise connections of which to the clutch are not shown as the clutch may be operated by any approved mechanism. It is desired, however, that the clutch be capable of being operated quickly so as to stop the operation or travel of the belt should the free and regular feed of the plates be interrupted for any cause.

The operation of the machine has doubtless been made clear from the foregoing description so that a complete and connected restatement of the operation will be unnecessary, it being understood that the plates will be supplied by the operator to the feed magazine as fast as necessary, and that they will be rapidly carried through the machine so that the lugs will be sawed off to uniform length and will be milled on both sides so as to clean them, and finally they will be stacked up on the inclined discharge board 66 at the rear end of the machine, and from which they will be taken in stacks or piles by another operator.

I do not desire to be confined to the exact details shown but aim in my claims to cover all modifications which do not involve a departure from the spirit and scope of my invention in its broadest aspects.

Having described my invention, I claim:

1. In a machine of the character described, a bed, lug cleaning tools rotatably supported thereby, a belt for carrying storage battery plates lengthwise of the bed past the cleaning tools, said bed and the feeding part of the belt being inclined to the horizontal, and a guide extending lengthwise of the bed and along which the plates are adapted to slide in their travel through the machine past the tools.

2. In a machine of the character described, a bed, having an inclined table, a feeding belt adapted to feed the plates along the table, a second belt above the feeding portion of the feeding belt designed to press the plates down onto the feeding belt and onto the table both said belts being inclined in conformity with the inclination of the table, and a guide and gage extending lengthwise of the table alongside the second-named belt adjacent its lowermost edge whereby the plates by the inclination of the conveying parts will be caused to slide along said guide, and cutting tools for cleaning lugs on the plates as the latter are carried through the machine.

3. In a machine for cleaning the lugs of storage battery plates, a bed and a pair of coöperating belts for conveying the plates lengthwise of the machine, the plate engaging portions of the belts being inclined to the horizontal, a feed magazine having an inclined wall against which the plates are adapted to bear, and a plurality of cutting tools along which the plates are carried so that their lugs will be cleaned by said tools.

4. In a machine for cleaning the lugs of storage battery plates, a feed magazine, a belt for conveying the plates from the feed magazine along the machine, tools for cleaning the lugs as the plates are fed through the machine, means for holding the plates down onto the belt as they pass the tools, and means whereby the feed magazine may be adjusted laterally with respect to the belt.

5. In a machine for cleaning the lugs of storage battery plates, a feed magazine, a belt for conveying the plates from the feed magazine along the machine, tools for cleaning the lugs as the plates are fed through the machine, means for holding the plates down onto the belt as they pass the tools, a guide for the plates extending from the feed magazine, and means whereby the feed magazine and guide may be adjusted laterally with respect to the belt.

6. In a machine for cleaning the lugs of storage battery plates, a feed magazine, a belt for conveying the plates from the feed magazine along the machine, tools for cleaning the lugs as the plates are fed through the machine, means for holding the plates down onto the belt as they pass the tools, a guide extending from the feed magazine, and means whereby the feed magazine and guide may be adjusted as a unit relative to the feeding belt.

7. In a machine for cleaning the lugs of storage battery plates, a bed, a feed magazine supported thereby, lug cleaning tools, a belt for conveying the plates from the magazine past the tools so that the lugs of the plates will be cleaned by the latter, a guide extending from the magazine and serving to guide the plates as they travel along the bed, and mechanism for simultaneously adjusting the magazine and guide as a unit laterally with respect to the bed.

8. In a machine for cleaning the lugs of storage battery plates, a bed, a feed magazine, a belt for carrying the plates one at a time from the feed magazine along the bed, cutting tools which clean the lugs of the plates as the latter are carried through the machine, said feed magazine having a transverse member arranged above the belt and spaced therefrom so that the plates may be carried by the belt under said member, said member having its lower edge beveled upwardly and forwardly or in a direction opposite to that in which the plates are fed.

9. In a machine for cleaning the lugs of storage battery plates, a bed, a feed magazine, lug cleaning tools, a belt having plate engaging members for taking the plates one at a time from the feed magazine and conveying them past the tools, and a yieldable means at the rear of the magazine for pressing the plates against said members as the plates are carried from the feed magazine.

10. In a machine for cleaning lugs of storage battery plates, a bed, a feed magazine, lug cleaning tools, a belt having cleats for taking the plates one at a time from the bottom of the feed magazine and for conveying them past the tools, said feed magazine having a transverse member under which the plates pass one at a time, and a spring on the rear side of said transverse member and extending downwardly toward the belt and close thereto so that the plates will engage said spring as they are carried by the belt from the magazine.

11. In a machine for cleaning lugs of storage battery plates, a bed or frame, a pair of lug cleaning tools, a belt for conveying the plates through the machine so that the lugs on said plates will pass between said tools, and a lug straightening member adapted to engage and straighten the lugs.

12. In a machine for cleaning lugs of storage battery plates, a bed or frame, a plurality of lug cleaning tools including a pair of milling tools between which the lugs are designed to pass, a belt for conveying the plates along the bed between said milling tools, and means for pressing the plates downward onto said belt as they are carried between the milling tools, said means comprising a roller located opposite the milling tools.

In testimony whereof I hereunto affix my signature.

PAUL E. NORRIS.